US012651925B1

(12) United States Patent
Suryanarayana et al.

(10) Patent No.: US 12,651,925 B1
(45) Date of Patent: Jun. 9, 2026

(54) ADAPTIVE FLUX BAND FOR IMPROVING TRANSFER TIMES IN A STATIC TRANSFER SWITCH

(71) Applicant: ABB Schweiz AG, Baden (CH)

(72) Inventors: Harish Suryanarayana, Apex, NC (US); Govind S. Chavan, Garner, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/975,502

(22) Filed: Dec. 10, 2024

(51) Int. Cl.
　　*H02J 9/06*　　　　(2006.01)
　　*H02H 3/26*　　　　(2006.01)
(52) U.S. Cl.
　　CPC ............. *H02J 9/068* (2020.01); *H02H 3/265* (2013.01); *H02J 9/062* (2013.01)
(58) Field of Classification Search
　　CPC . H02J 9/062; H02J 9/068; H02H 3/26; H02H 3/265
　　USPC .......................................................... 307/64
　　See application file for complete search history.

(56) References Cited

U.S. PATENT DOCUMENTS

| 11,682,920 B1 | 6/2023 | Zhang et al. |
| 2022/0247167 A1 | 8/2022 | Song et al. |

*Primary Examiner* — Hal Kaplan
(74) *Attorney, Agent, or Firm* — Fitch Even Tabin & Flannery LLP

(57) ABSTRACT

A transfer time for transferring power from a first power source to a second power source, and an inrush current not be exceeded during the transfer are obtained. A phase difference between the first power source and the second power source is determined based on electrical measurements from the first power source and the second power source. The first power source is disconnected from a load based on a detected disturbance with the first power source. One or more flux bands are determined based on the phase difference, the transfer time, and the inrush current. A first connection between the second power source and the load is initiated by instructing each switch of a corresponding semiconductor switch assembly of the second power source to turn on at certain times based on flux matching using the determined one or more flux bands.

20 Claims, 7 Drawing Sheets

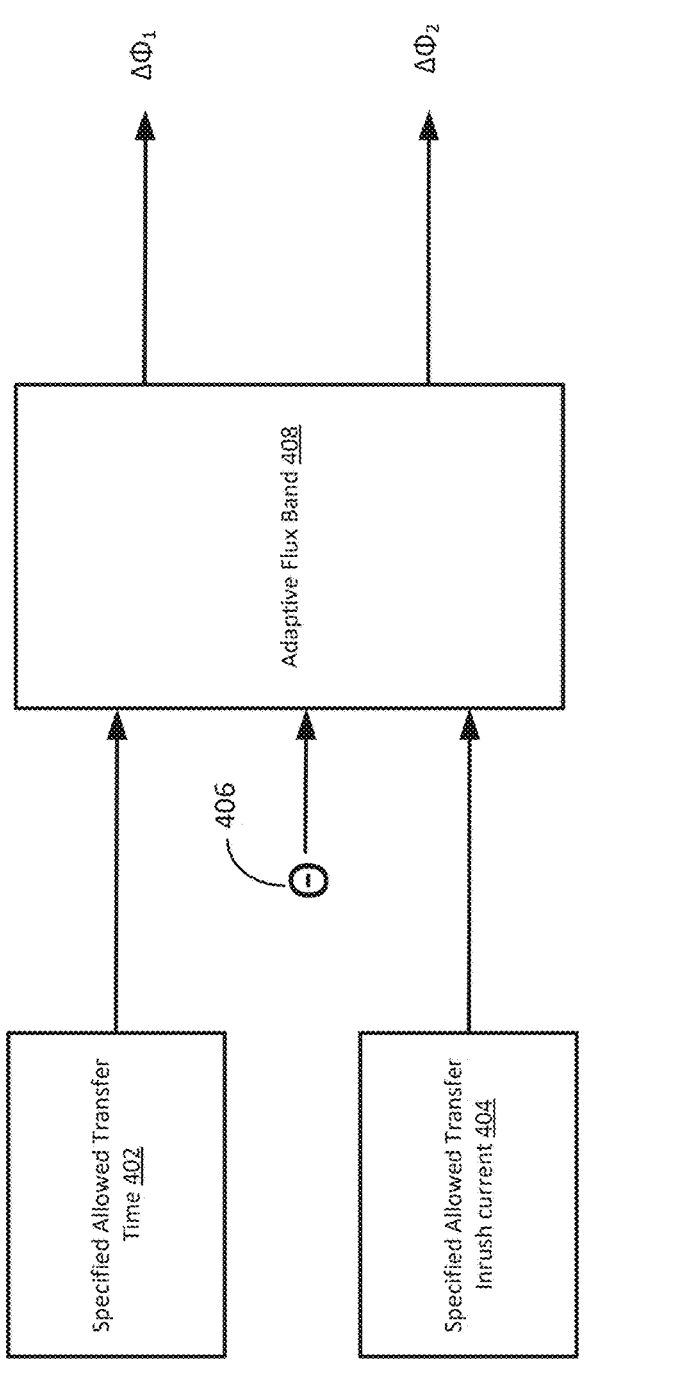
FIG. 4

<u>600</u>

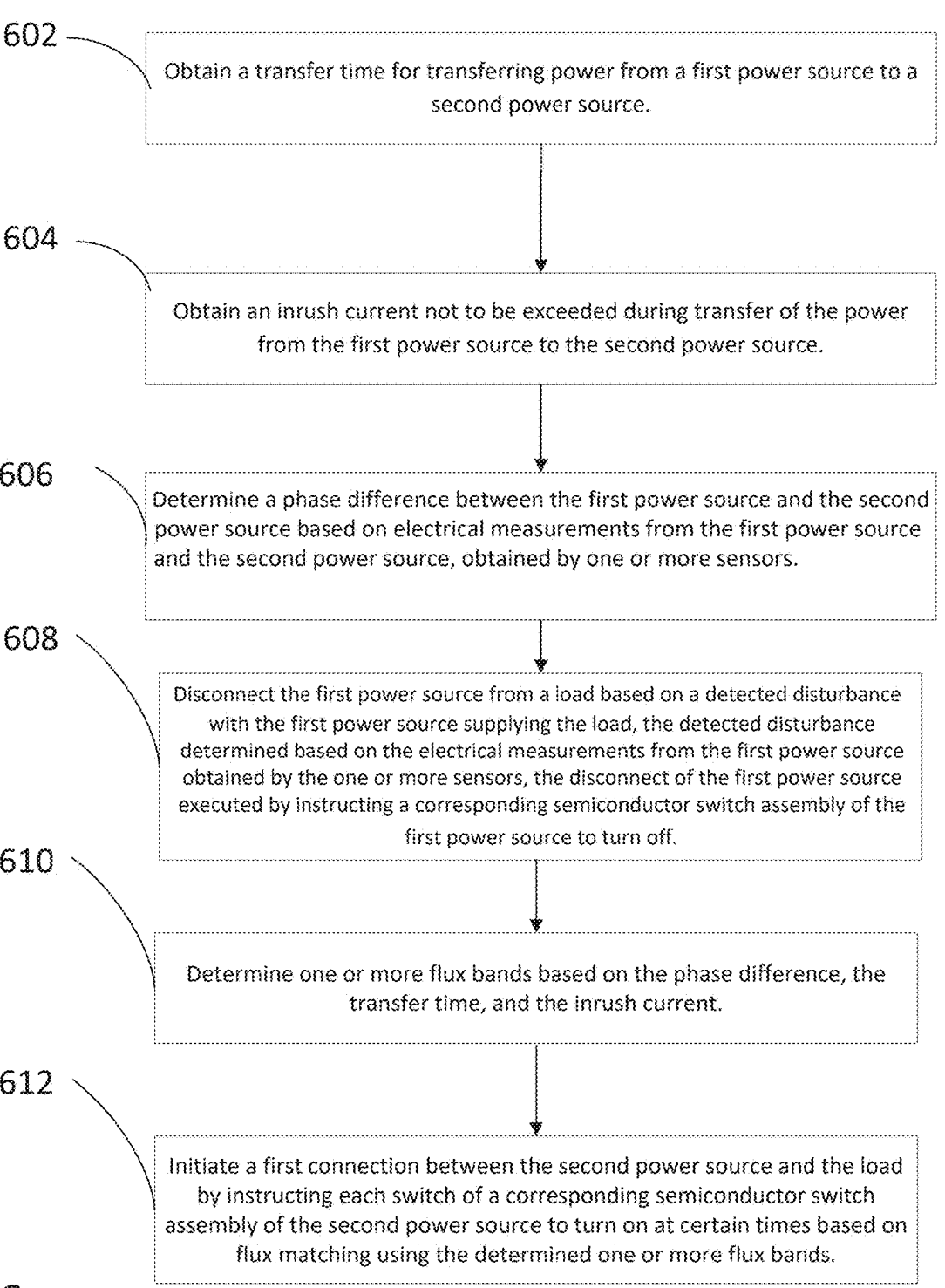

602 — Obtain a transfer time for transferring power from a first power source to a second power source.

604 — Obtain an inrush current not to be exceeded during transfer of the power from the first power source to the second power source.

606 — Determine a phase difference between the first power source and the second power source based on electrical measurements from the first power source and the second power source, obtained by one or more sensors.

608 — Disconnect the first power source from a load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off.

610 — Determine one or more flux bands based on the phase difference, the transfer time, and the inrush current.

612 — Initiate a first connection between the second power source and the load by instructing each switch of a corresponding semiconductor switch assembly of the second power source to turn on at certain times based on flux matching using the determined one or more flux bands.

ADAPTIVE FLUX BAND FOR IMPROVING TRANSFER TIMES IN A STATIC TRANSFER SWITCH

FIELD

The invention relates to a switching arrangement, a system, and a method for load transfer of supply voltage and improving transfer times during the transfer of the load by a static transfer switch (STS) between power sources.

BACKGROUND

Automatic Transfer Switches (ATS) are widely used in AC power distribution systems to provide reliable power to critical applications by switching between a preferred power source and a backup source. The typical operation of an ATS involves electromechanical switches, which take time to transition between on and off states, leading to transfer delays ranging from tens to hundreds of milliseconds. While these delays are tolerable in non-critical applications, they can be problematic in sensitive environments such as hospitals or industrial systems. A faster solution, the Static Transfer Switch (STS), which uses semiconductor switches like silicon-controlled rectifiers (SCRs), offers much quicker transfer times (under 20 milliseconds).

To improve efficiency, WO2018157915A1 proposes combining a fast mechanical commutating switch (FCS) in parallel with semiconductors in the STS. This hybrid solution reduces conduction losses, but it remains costly due to the expensive FCS components and the need for semiconductors to handle short-circuit currents. While this system is more efficient than traditional STS setups, it is not cost-effective compared to ATS systems.

SUMMARY

An embodiment of the present disclosure provides a transfer switch system for transferring power from a first power source to a second power source, the transfer switch system including one or more sensors configured to detect an electrical measurement associated with powering a load between the first power source, the second power source, and a downstream transformer, one or more semiconductor switch assemblies, the first power source and the second power source associated with a different semiconductor switch assembly of the one or more semiconductor switch assembly of the one or more semiconductor switch assemblies, and a controller configured to: obtain a transfer time for transferring the power from the first power source to the second power source, obtain an inrush current not to be exceeded during transfer of the power from the first power source to the second power source, determine a phase difference between the first power source and the second power source based on electrical measurements from the first power source and the second power source, obtained by the one or more sensors, disconnect the first power source from the load based on a detected disturbance with the first power source supplying the load, the detected disturbance determined based on the electrical measurements from the first power source obtained by the one or more sensors, the disconnect of the first power source executed by instructing, by the controller, the corresponding semiconductor switch assembly of the first power source to turn off, determine one or more flux bands based on the phase difference, the transfer time, and the inrush current, and initiate a first connection between the second power source and the load by instructing each switch of the corresponding semiconductor switch assembly of the second power source to turn on at certain times based on flux matching using the determined one or more flux bands.

In an embodiment of the transfer switch system, the one or more semiconductor switch assemblies include at least one of silicon-controlled rectifiers (SCRs), insulate gate bipolar transistors (IGBTs), metal-oxide-semiconductors (MOSFETs), integrated gate-commutated thyristors (IGCTs), and gate turn-off thyristors (GTOs).

In an embodiment of the transfer switch system, the transfer switch system further includes the downstream transformer, wherein the first power source and the second power source are configured to provide the power to the load via the downstream transformer.

In an embodiment of the transfer switch system, the transfer time and the inrush current are user specified.

In an embodiment of the transfer switch system, the controller is further configured to: determine an updated phase difference between the first power source and the second power source based on the electrical measurements from the first power source, the second power source, and the downstream transformer obtained by the one or more sensors, disconnect the second power source from the load based on an updated detected disturbance with the second power source providing the load, the updated detected disturbance based on the electrical measurements from the second power source obtained by the one or more sensors, the disconnect of the second power source executed by instructing, by the controller, the corresponding semiconductor switch assembly of the second power source to turn off, determine updated one or more flux bands based on the updated phase difference, the transfer time, and the inrush current, and initiate a second connection between the first power source and the load by instructing each switch of the corresponding semiconductor switch assembly of the first power source to turn on at certain times based on the updated one or more flux bands.

In an embodiment of the transfer switch system, the one or more flux bands are updated as the first connection is initiated and as a first portion of switches of the corresponding semiconductor switch assembly of the second power source are turned on by adjusting the phase difference between the second power source and the downstream transformer based on updated electrical measurements from the second power source and the downstream transformer obtained by the one or more sensors.

In an embodiment of the transfer switch system, each switch or a set of switches of the semiconductor switch assemblies is associated with a different phase of an A/C voltage supplied to the load.

In an embodiment of the transfer switch system, the transfer time and the inrush current are limited by using characteristics of the downstream transformer.

In an embodiment of the transfer switch system, the controller is further configured to adjust the transfer time and the inrush current based on characteristics of the downstream transformer.

In an embodiment of the transfer switch system, the controller is further configured to: obtain an actual transfer time for transferring the power from the first power source to the second power source derived from initiating a transfer; and adjust the one or more flux bands based on the actual transfer time.

Another embodiment of the present disclosure provides a tangible, non-transitory computer-readable medium having instructions thereon which, upon being executed by one or more processors, provide for transferring power from a first power source to a second power source by execution of the following steps: obtaining a transfer time for transferring the power from the first power source to the second power source, obtaining an inrush current not to be exceeded during transfer of the power from the first power source to the second power source, determining a phase difference between the first power source and the second power source based on electrical measurements from the first power source and the second power source, obtained by one or more sensors, disconnecting the first power source from a load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off, determining one or more flux bands based on the phase difference, the transfer time, and the inrush current, and initiating a first connection between the second power source and the load by instructing each switch of a corresponding semiconductor switch assembly of the second power source to turn on at certain times based on flux matching using the determined one or more flux bands.

In an embodiment of the tangible, non-transitory computer-readable medium, the transfer time and the inrush current are user specified.

In an embodiment of the tangible, non-transitory computer-readable medium, wherein the instructions, upon being executed by the one or more processors, are further configured to execute the following steps: determining an updated phase difference between the first power source and the second power source based on the electrical measurements from the first power source, the second power source, and an associated downstream transformer obtained by the one or more sensors, disconnecting the second power source from the load based on an updated detected disturbance with the second power source providing the load, the updated detected disturbance based on the electrical measurements from the second power source obtained by the one or more sensors, the disconnect of the second power source executed by instructing the corresponding semiconductor switch assembly of the second power source to turn off, determining updated one or more flux bands based on the updated phase difference, the transfer time, and the inrush current, and initiating a second connection between the first power source and the load by instructing each switch of the corresponding semiconductor switch assembly of the first power source to turn on at certain times based on the updated one or more flux bands.

In an embodiment of the tangible, non-transitory computer-readable medium, the one or more flux bands are updated as the first connection is initiated and as a first portion of switches of the corresponding semiconductor switch assembly of the second power source are turned on by adjusting the phase difference between the second power source and an associated downstream transformer based on updated electrical measurements from the second power source and the associated downstream transformer obtained by the one or more sensors.

In an embodiment of the tangible, non-transitory computer-readable medium, each switch or a set of switches of the corresponding semiconductor switch assemblies is associated with a different phase of an A/C voltage supplied to the load.

In an embodiment of the tangible, non-transitory computer-readable medium, the transfer time and the inrush current are limited by using characteristics of an associated downstream transformer.

In an embodiment of the tangible, non-transitory computer-readable medium, wherein the instructions, upon being executed by the one or more processors, are further configured to execute the following steps: adjusting the transfer time and the inrush current based on characteristics of an associated downstream transformer.

In an embodiment of the tangible, non-transitory computer-readable medium, wherein the instructions, upon being executed by the one or more processors, are further configured to execute the following steps: obtaining an actual transfer time for transferring the power from the first power source to the second power source derived from initiating a transfer, and adjusting the one or more flux bands based on the actual transfer time.

Another embodiment of the present disclosure provides a computer-implemented method for transferring power from a first power source to a second power source, including: obtaining a transfer time for transferring the power from the first power source to the second power source, obtaining an inrush current not to be exceeded during transfer of the power from the first power source to the second power source, determining a phase difference between the first power source and the second power source based on electrical measurements from the first power source and the second power source, obtained by one or more sensors, disconnecting the first power source from a load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off, determining one or more flux bands based on the phase difference, the transfer time, and the inrush current, and initiating a first connection between the second power source and the load by instructing each switch of a corresponding semiconductor switch assembly of the second power source to turn on at certain times based on flux matching using the determined one or more flux bands.

In an embodiment of the computer-implemented method, the one or more flux bands are updated as the first connection is initiated and as a first portion of switches of the corresponding semiconductor switch assembly of the second power source are turned on by adjusting the phase difference between the second power source and an associated downstream transformer based on updated electrical measurements from the second power source and the associated downstream transformer obtained by the one or more sensors.

BRIEF DESCRIPTION OF DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

5

Figure 1:
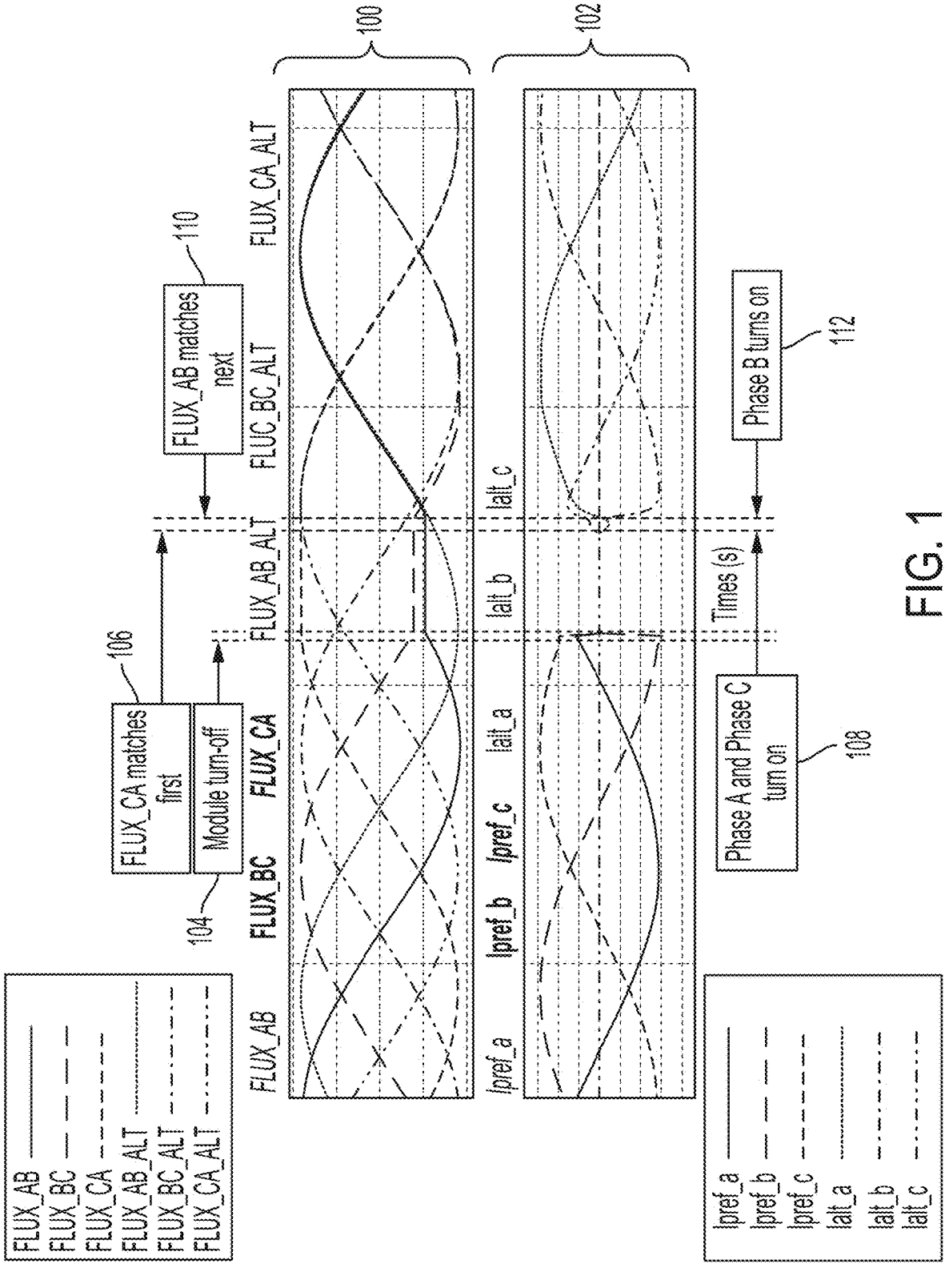
Figure 2:
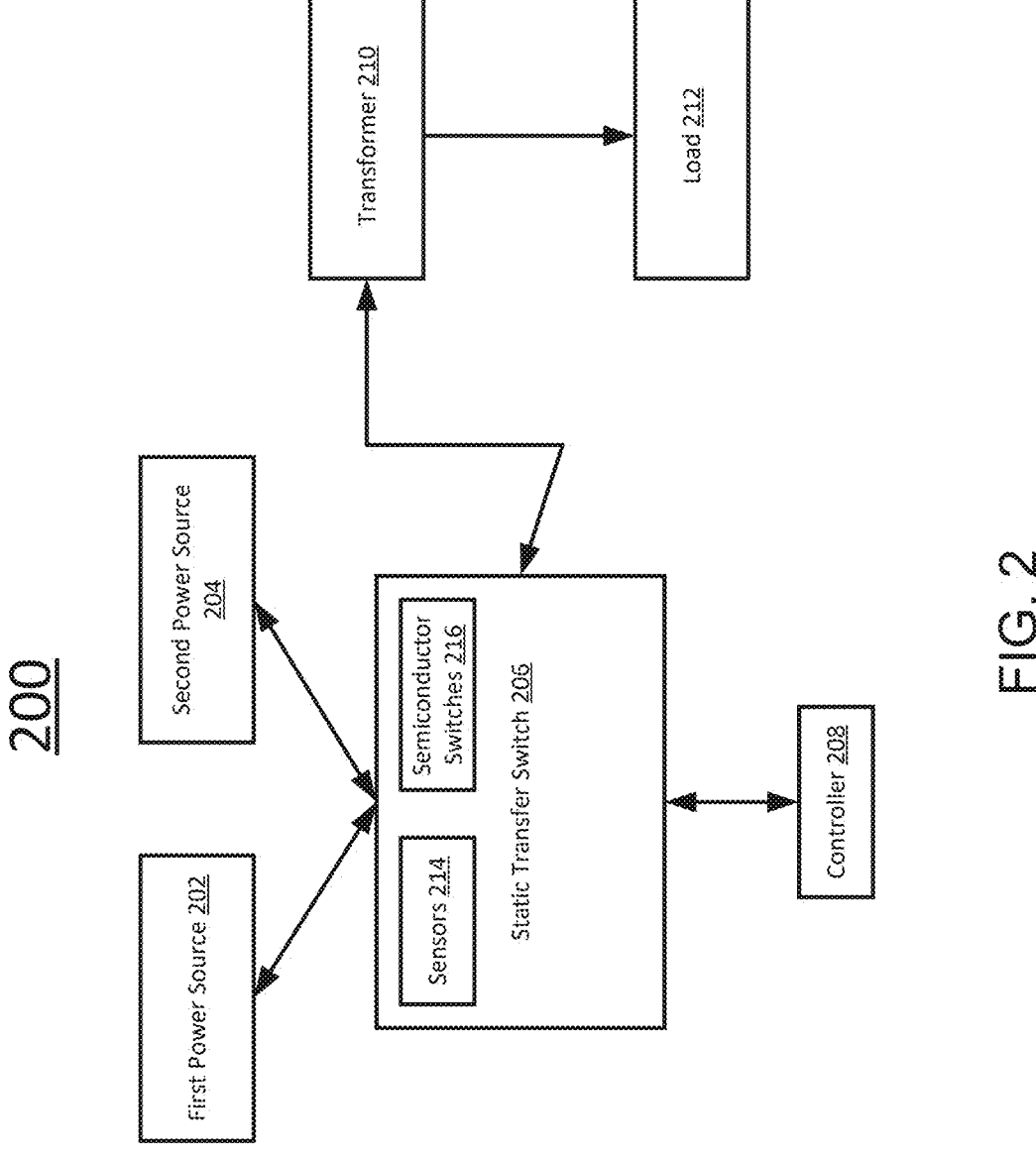
Figure 3:
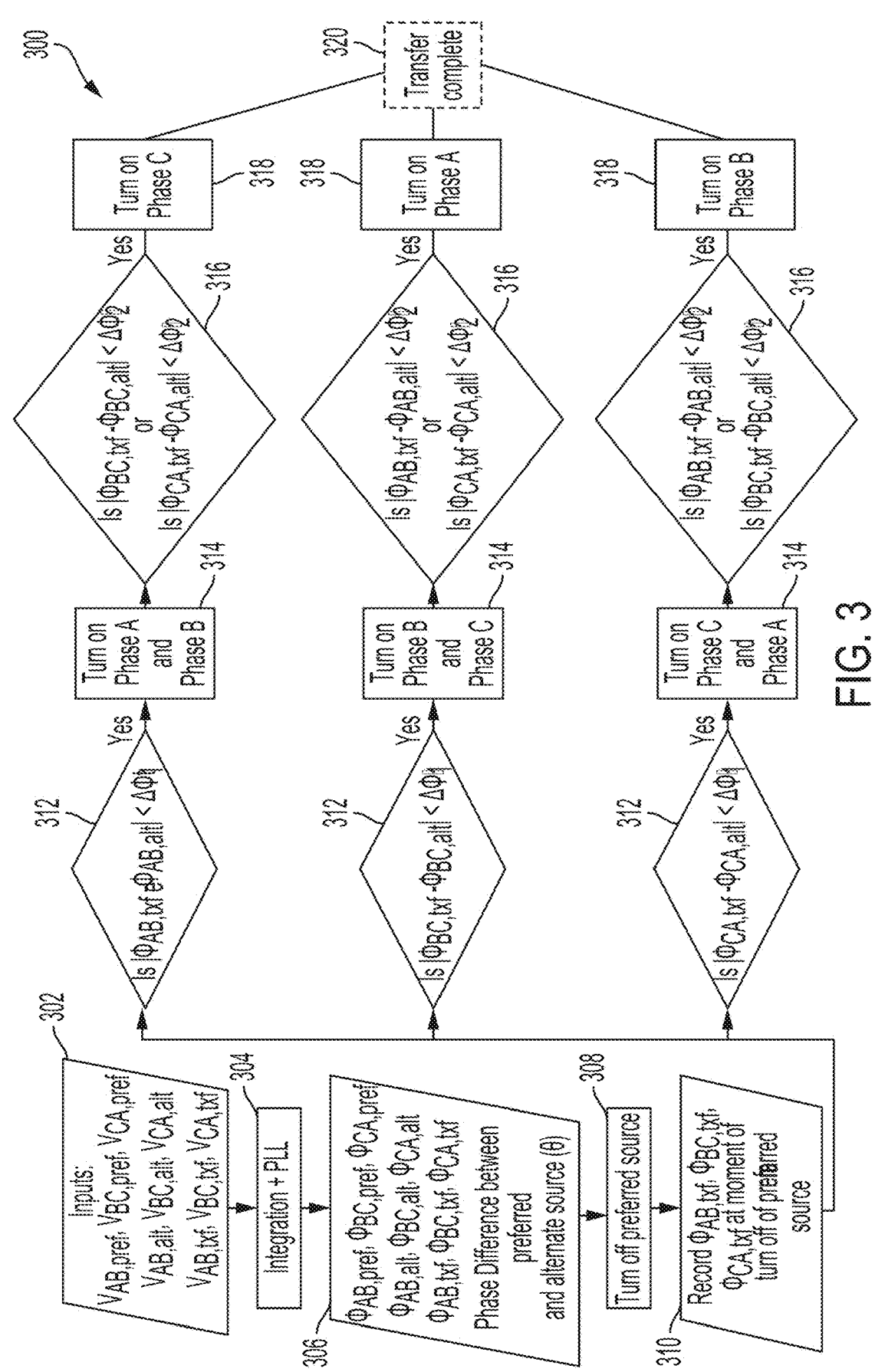
Figure 5:
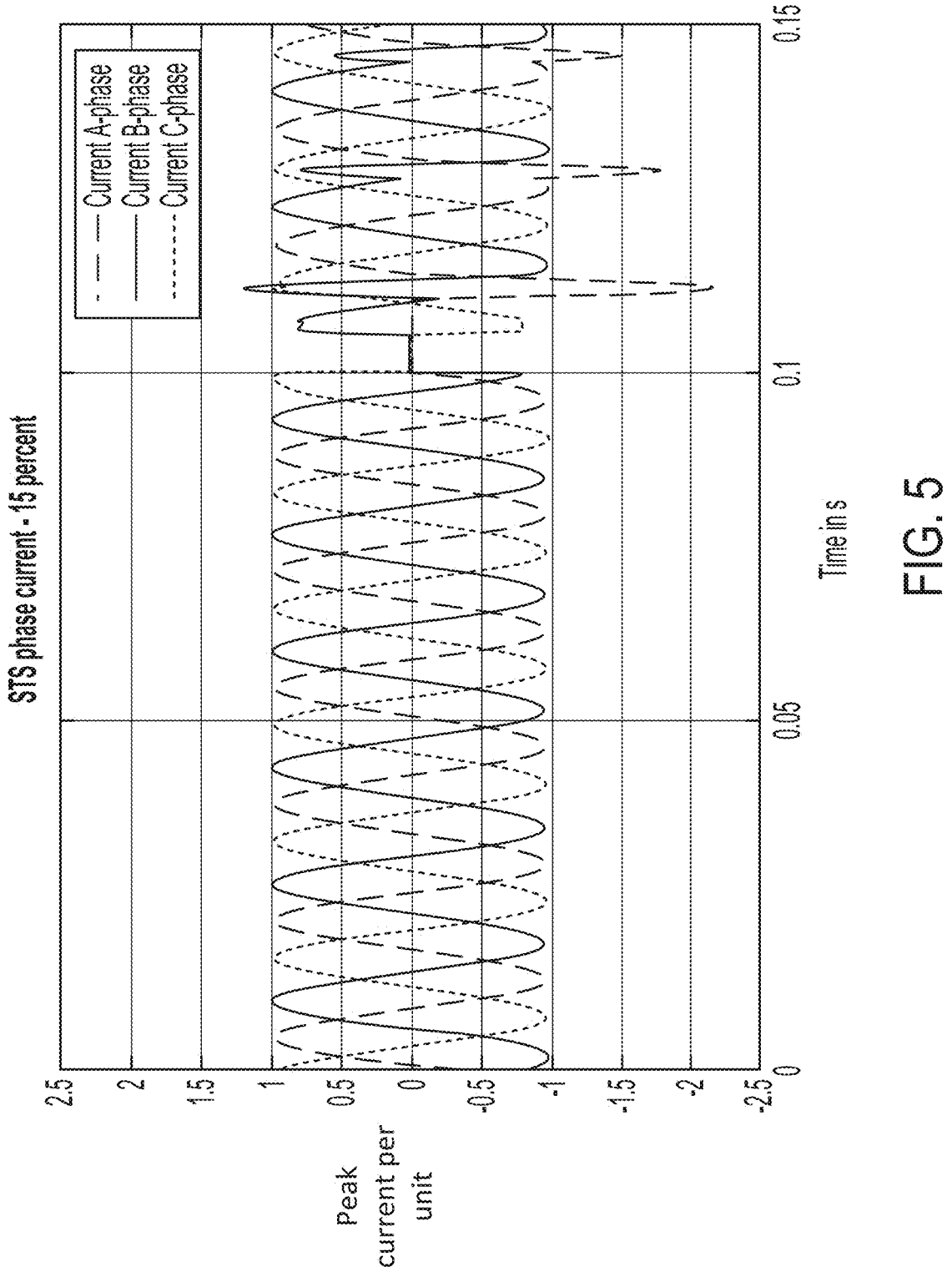
Figure 7:
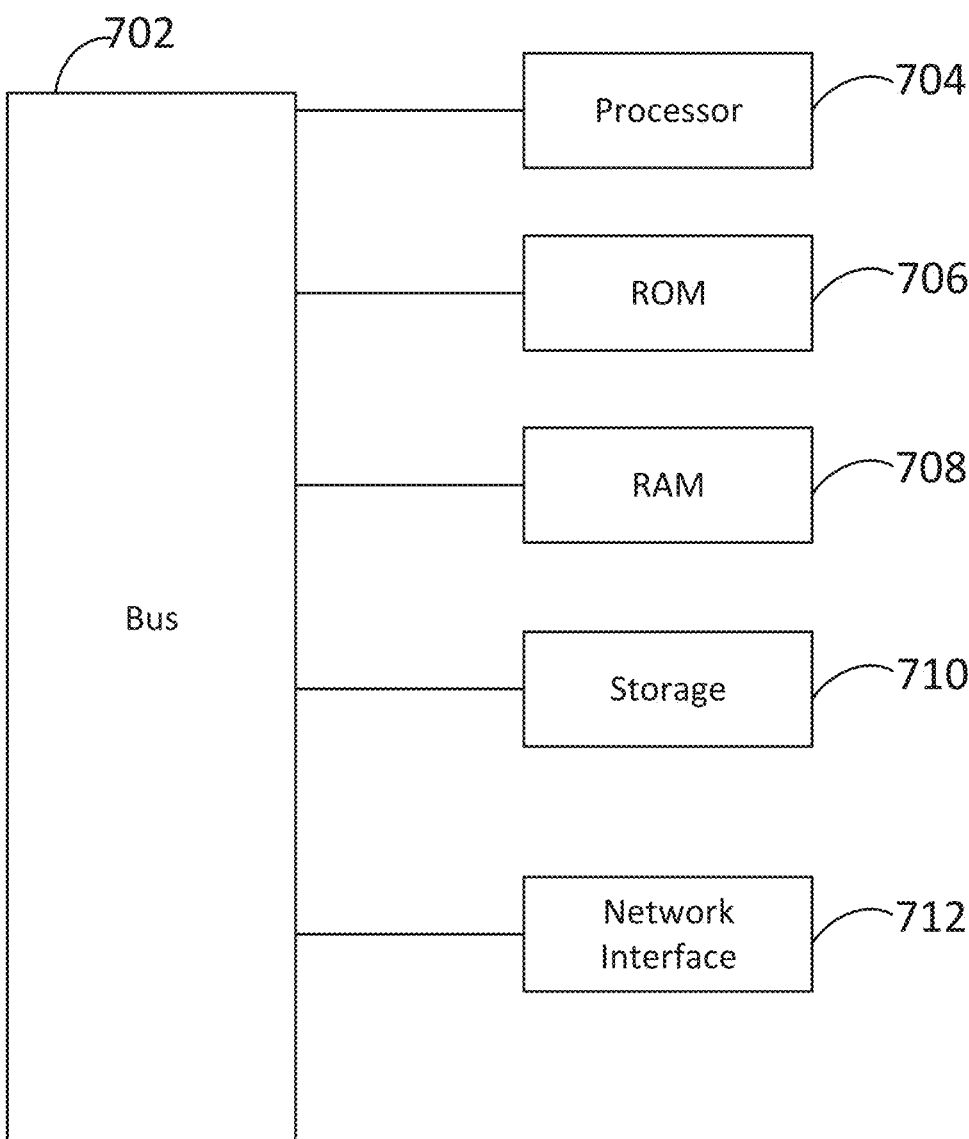

FIG. 1 depicts waveforms representing transformer flux and STS phase current generated using a conventional dynamic inrush restraint (DIR) algorithm;

FIG. 2 depicts a simplified block diagram depicting an exemplary STS environment using adaptable flux bands in accordance with one or more examples of the present disclosure;

FIG. 3 depicts an exemplary flowchart of the DIR algorithm that is modified by the adaptive flux band features of the present disclosure in accordance with one or more examples of the present disclosure;

FIG. 4 depicts an exemplary flowchart of the adaptive flux band features of the present disclosure in accordance with one or more examples of the present disclosure;

FIG. 5 depicts an example graph illustrating the increase in inrush current over time using a relaxed flux band in accordance with one or more examples of the present disclosure;

FIG. 6 depicts an example flowchart for adaptive flux band features in accordance with one or more examples of the present disclosure; and FIG. 7 is a simplified block diagram of one or more devices or systems within the exemplary environment of FIG. 2.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the present disclosure provide for features for improving the transfer time and flexibility to modify the transfer current during the transfer in an STS. The features described herein may add on to or modify a DIR algorithm to provide improved performance to an electric distribution system and add flexibility to such a system. In an exemplary embodiment the features of the present disclosure may adaptively modify the flux band used to check flux matching in the DIR algorithm implemented by an STS based on the phase difference between a first power source (preferred power source) and a second power source (alternative power source). The transfer current during out-of-phase transfer by the STS can be limited based on protection settings such that if a higher transformer transfer current is allowed, the transfer time between power sources can be lowered. As will be discussed below in further detail, an STS transfers power delivery from a first power source to a second power source in a rapid fashion in scenarios where there is a problem or issue with the first power source, and vice versa. The amount of time taken for this transfer to occur is a critical metric of an STS. Typically, as depicted in FIG. 2, there is a transformer that is downstream of the STS. The transformer inrush current during a transfer executed by the STS, which will be referred to herein as transfer inrush current, must be limited to prevent any upstream breakers of the electric distribution system from tripping.

FIG. 1 depicts waveforms representing transformer flux and STS phase current generated using a conventional dynamic inrush restraint (DIR) algorithm. The DIR algorithm usually operates by estimating transformer flux from input voltage from both a preferred power source and alternate power source. At the time of transfer by the STS, the DIR algorithm attempts to look for a match in the estimated flux before first connecting two phases (e.g. one leg), and then looks for a match again before connecting the third phase (all legs). FIG. 1 depicts, on the top graph 100, the calculated flux of phases, AB, BC, CA from a preferred power source and an alternative power source plotted over time, and on the bottom graph 102, the phase currents of phases a, b, and c from the preferred power source and alternative power source plotted over time.

As depicted in FIG. 1, in response to an issue with the preferred power source, a controller of an STS sends an instruction to a module, such as a Silicon Carbide (SiC) module of the STS, to turn off thereby ending the transmission of power from the preferred source at 104. In response to this, the DIR algorithm, as described above, looks for a match in the estimated flux before connecting two phases. In FIG. 1, this is depicted at 106 where FLUX-CA matches first which in turn results in the controller of the STS providing an instruction to turn on the phase A and phase C switches 108 associated with the alternative power source. Next, the DIR algorithm looks for the next match which is represented at 110 where FLUX_AB matches. This results in the instruction being provided by the controller to turn on the phase B switch 112. As is depicted in FIG. 1, this results in the complete transfer between the preferred power source and alternate power source using an algorithm that attempts to match the flux bands within a certain range before turning on switches to complete the transfer between a first power source and second power source. Typically, the DIR algorithm uses a certain fixed value for the band.

In a traditional STS absent the innovative features of the present disclosure, the total transfer time between power sources depends on three components: (1) time to detect an issue (e.g., power quality or drop in current provided by power source) with the preferred power source ($t_A$); (2) time taken for a current to reach zero in the preferred power source before the switches or rectifiers, such as silicon-controlled rectifiers (SCRs) can be turned off ($t_B$); and (3) time taken for the estimated fluxes from the preferred power source and the alternative power source to match before turning on the alternative power source based on the DIR algorithm ($t_C$). In scenarios where the STS is a SIC STS, the disconnection/turn-off time, $t_B$, is rapid (less than 1 millisecond (ms)), and so the transfer time is mostly affected by the time taken to match fluxes using the DIR algorithm $t_C$. The phrase "transfer time" as used herein will be represented as ($t_{transfer}$) and refers to the time taken from the moment the disconnect from preferred source signal is received to the moment all three phases of the alternative power source are connected to the downstream transformer. The transfer time therefore can be determined by:

$$t_{transfer} = t_B + t_C.$$

In conventional STSs which implement the DIR algorithm, the transfer time is usually less than 20 ms, and an SiC STS can lower the transfer time to be lower than 12 ms by just reducing the tp. The present disclosure provides solutions which improve the DIR algorithm to obtain a faster transfer time in both traditional STSs and SiC STSs by reducing $t_C$. As discussed above, in the DIR algorithm, the turn on of the alternate power source (second power source) is dependent on matching the estimated flux from the alternate power source with the constant residual flux after the preferred power source (first power source) is completely turned off. The DIR algorithm typically uses a fixed matching band that is a certain fixed value for matching the estimated flux from the alternate power source with the constant residual flux after the preferred power source (first power source) is completely turned off. The present disclosure proposes relaxing this matching band thereby allowing for faster transfer time due to the possibility of faster flux matching. However, the transfer inrush current may increase due to flux mismatch when a larger matching band is allowed by the proposed modified algorithm of the present disclose. An STS guarantees that a certain maximum transfer inrush current will not be exceed during a transfer operation and therefore the adaptable flux matching bands of the present disclosure are limited by a maximum transfer inrush current parameter. The present disclosure describes a detailed non-linear transformer model that can accurately capture the transfer current characteristics required to determine an adaptable flux band during a transfer operation between a first power source and a second power source by an STS. The reduce $t_C$, the adaptable flux bands, represented herein as $\Delta\Phi1$ and $\Delta\Phi2$, are determined based on the phase difference between the preferred power source and alternate power source before transfer—described and depicted below with reference to FIGS. 3 and 4. As described above, conventional STSs may utilize a set flux match band or value that represents a fixed value. The adaptable flux bands of the present solution can be adaptively changed depending on the phase difference and user specified metrics of a maximum allowed transfer time (transfer time) and an maximum allowed transfer inrush current (inrush current). In some embodiments, the change to the adaptable flux bands can be implemented as a look-up table or as a function determined by the controller of the STS. The look-up table and/or function can be obtained from simulations executed by the controller in an electric distribution system using testing data of an associated downstream transformer.

FIG. 2 depicts a simplified block diagram depicting an exemplary STS environment 200 using adaptable flux bands in accordance with one or more examples of the present disclosure. FIG. 2 includes power sources a first power source (preferred power source) 202, a second power source (alternative power source) 204, a static transfer switch 206, a controller 208, a transformer (downstream transformer) 210, and a load 212. Power sources 202 and 204 may provide power to power one or more loads such as load 212. For example, the first power source 202 may provide power to the load 212. After a certain amount of time or in response to an issue with the first power source 202 (e.g. drop in current or disruption in voltage), the first power source 202 may be disconnected from the load 212, and instead, the second power source 204 may be connected to the load 212. In some examples, the first power source 202 may be a primary source or preferred power source and the second power source 204 may be a backup, a secondary, or alternative power source. In some variations, the first power source 202 and the second power source 204 may be alternating current (AC) power sources that provide alternating current/power to the load 212. In some variations, the first power source 202 and the second power source 204 may be single phase or three phase power sources.

The load 212 may be any type of load that uses power from the power sources 202 and 204 to perform one or more tasks. In some embodiments, the load 212 may accept AC power and/or direct current (DC) power from the power sources 202 and 204 via the transformer 210. The transformer 210 may be a device that transfers electrical energy from one circuit to another circuit (e.g., from the power sources 202 and 204 to the load 212). In some instances, the transformer 210 may convert and/or otherwise alter the current, voltage, and/or power from the power sources 202 and 204 prior to providing the current, voltage, and/or power to the load 212. For instance, the transformer 210 may step up and/or step down the current from the power sources 202 and 204 prior to providing the current to the load 212. Additionally, and/or alternatively, the transformer may convert the current from the power sources 102 (e.g., AC current) to another type of current (e.g., DC current).

The controller 208 is in electrical communication with one or more components of the static transfer switch 208. In some embodiments, the controller 208 is a component or otherwise integrated into the static transfer switch 206. Additionally, and/or alternatively, while not shown, the controller 208 may also be in communication with other components within the environment 200 including the power sources 202 and 204, the transformer 210, and/or the load 212. For instance, the controller 208 may be in communication with the transformer 210 and/or one or more sensors associated with the transformer 210 to determine the status of the transformer 210. The controller 208 may be any type of hardware and/or software logic, such as a central processing unit (CPU), RASPBERRY PI processor/logic, processor, and/or logic, that executes computer executable instructions for performing the functions, processes, and/or methods described herein.

The static transfer switch 206 may include one or more sensors 214 and one or more semiconductor switches 216. In some embodiments, the static transfer switch 206 includes mechanical switches which may be any type of physical switch with mechanical moving parts. The controller 208 may use one or more components of the static transfer switch 206 to swiftly switch between powering the load 212 using the first power source 202 and powering the load 212 using the second power source 204, based on measurements obtained from the sensors 214 of the static transfer switch 206.

The sensors 214 may include current sensors, voltage sensors, and/or other sensors that provide measurements (e.g., current measurements) to the controller 208. The semiconductor switches 216 may be any type of semiconductor switching devices (e.g., silicon-controlled rectifiers (SCRs), solid state switchers, or other semiconductor switches, Gate turn-off (GTO) thyristors, Integrated gate-commutated thyristors (IGCTs), Insulated gate bipolar transistors (IGBTs), Metal-oxide-semiconductor field effect transistors (MOSFETs)). These semiconductor switches 216 may have forced commutation circuits that allow current interruption at instances other than a zero current crossing. In some embodiments, the semiconductor switch(es) 216 is/are a four-quadrant switch, i.e., it is capable of blocking voltages of both polarities and capable of carrying current in both directions.

The semiconductor switches 216 are configured to swiftly switch between powering the load 212 using the first power source 202 and the second power source 204. For instance, the controller 208 may use the semiconductor switches 216 to switch between powering the load 212 using the first power source 202 to powering the load 212 using the second power source 204, and vice versa.

In some examples, the controller 208 may switch how the load 212 is being powered based on one or more factors. For instance, initially, the load 212 may be powered by the first power source 202. Based on the one or more factors, the controller 208 may switch from powering the load 212 using the first power source 202 to powering the load 212 using the second power source 204. After a certain amount of time has elapsed, the controller 208 may switch back and power the load 212 using the first power source 202. These factors may include, but are not limited to, sudden increase or decrease of voltage (AC) of the first power source 202, sudden increase or decrease of the frequency of the first power source 202, inability by the first power source 202 to provide the necessary power required by load 212, and failure of the first power source 202. In some examples, the controller 208 may be configured to routinely transfer between using the first power source 202 and the second power source 204 for powering the load 212. In such examples, the static transfer switch 206 may switch between the first power source 202 and second power source 204 occasionally and/or periodically at regular intervals of time.

In some embodiments, the controller 208 may determine that the first power source 202 is unable to supply power to the load 212. For example, the controller 208 may determine a sudden increase or decrease of voltage of the first power source 202, sudden increase or decrease of the frequency of the first power source 202, inability by the first power source 202 to provide the necessary power required by load 212, or failure of the first power source 202. In such cases, the controller 208 may instruct the static transfer switch 206 to disconnect the first power source 202 from the load 212. The static transfer switch 206 may disconnect a mechanical switch from the first power source 202 or, instruct or relay an instruction from the controller 208 to the semiconductor switches 216 to turn off, thereby severing the connection between the first power source 202 and the load 212.

Once the first power source 202 is disconnected from the load 212, the current from the first power source 202 to the load 212 reduces to zero. When the controller 208, using sensors 214, determines that the current from the first power source 202 to the load 212 is zero or close to zero, the controller 208 instructs the static transfer switch 206 to initiate connections between the second power source 204 and the load 212 by finding where flux bands (estimated fluxes) between the second power source 204 and the first power source 202 match, within a flux band range that is adaptable as described herein. Once the semiconductor switches 216 for the second power source 204 are turned on, accounting for all three phases in a three phase AC power system, the connection between the second power source 204 and the load 212 is complete. In embodiments, the static transfer switch 206 may have a set of semiconductor switches 216 associated with the first power source 202 for turning on or off and a set of semiconductor switches 216 associated with the second power source 204.

In some embodiments, the controller 208 of the static transfer switch 206 may control inrush current that flows from the second power source 204 during the transfer from the first power source 202 to the second power source 204. In order to perform the transfer from the first power source 202 to the second power source 204, the controller 208 estimates a load transformer flux from a voltage of the first power source 202 till the load current from the first power source 202 drops to zero. At this point, the controller 208 instructs the static transfer switch 206 to disconnect the transformer 210 from the first power source 202, and the transformer flux becomes locked at this value. The controller 208 also measures voltage and estimates the resultant transformer flux based on voltage of the second power source 204. When the estimated transformer flux of the second power source 204 equals or matches the locked transformer flux (e.g. the two fluxes are within a band range of each other) after the disconnection from first power source 202, the controller 208 instructs the static transfer switch 206 to use the semiconductor switches 216 to turn on according to the matching phases thereby completing the transfer process.

FIG. 3 depicts an exemplary flowchart 300 of the DIR algorithm that is modified by the adaptive flux band features of the present disclosure in accordance with one or more examples of the present disclosure. In FIG. 3, the flowchart 300 includes obtaining, by sensors of the static transfer switch, the voltages from the preferred power source (e.g. $V_{AB,pref}$), the alternative power source (e.g. $V_{AB,pref}$), and the transformer (e.g. $V_{AB,txf}$) at 302. The flowchart 300 includes, at 304 and 306, integrating the line to line voltages from the preferred power source, the alternative power source, and the transformer to obtain the flux values and determine the phase difference between the preferred power source and alternative power source, represented as θ. In embodiments, FIG. 3 includes at 304 using a phase-locked loop (PLL). A PLL may, with an AC signal as input, provide the frequency and phase of that signal as output. In embodiments, integrating the voltages gives the flux. The phase difference between a preferred and alternate power source is obtained based on the voltage at the preferred power source and at the alternate power source. At 308 of the flowchart 300 the static transfer switch may turn off the preferred power source in response to an issue with the preferred power source by instructing semiconductor switches associated with the preferred power source to turn off. The flowchart 300 includes, at 310, recording or otherwise obtaining the integral of the flux of the transformer at the moment of turning off the preferred power source represented in FIG. 3 as $\Phi_{AB,txf}$.

The flowchart 300 at 312 includes the algorithm implemented by the controller of the static transfer switch determining whether the flux of the transformer at given phases (e.g., $\Phi_{AB,txf}$, $\Phi_{BC,txf}$, and $\Phi_{CA,txf}$) at the moment of turning off the preferred source 310 matches the flux of the alternative power source (e.g., $\Phi_{AB,alt}$, $\Phi_{BC,alt}$, and $\Phi_{CA,alt}$). Put another way, are the flux bands of the transformer and alternative power source, across the three AC phases, within a given flux band represented as $\Delta\Phi1$ and $\Delta\Phi2$. Note that in the conventional DIR algorithm $\Delta\Phi1$ and $\Delta\Phi2$ are fixed values or are a certain value that the flux bands of the transformer and alternative power source must be equal to or less than in order for the controller to determine that the phases are matching and, so that the controller can turn on certain semiconductor switches of the alternative power source to reduce inrush current during transfer between power sources. The flowchart 300 includes at 314 instructions provided by the controller to certain sets or certain ones of the semiconductor switches of the static transfer switch to turn on depending on which phases match first (e.g., turn on Phase A and Phase B when $\Phi_{AB,txf}$-$\Phi_{AB,alt}$ is less than or equal to $\Delta\Phi1$). The flowchart 300 includes at 316 comparing the fluxes of the remaining phase to determine which phase to turn on depending on the selection made at 314. The controller of the static transfer switch may obtain updated flux values for the remaining phase at the alternative power source and transformer because conditions within the system are updated based on turning on two other phases at 314. Again, at 316, the flux bands of the alternative power source for the remaining phase are compared to the flux bands of the transformer to determine if they are within a flux band (e.g. $\Delta\Phi 2$). When the remaining flux bands match an instruction is provided by the controller to turn on the appropriate semiconductor switch for that phase at 318 thereby completing transfer of power to the load from the preferred power source to the alternative power source at 320.

FIG. 4 depicts an exemplary flowchart 400 of the adaptive flux band features of the present disclosure in accordance with one or more examples of the present disclosure. As described herein, the flux bands may be adaptively determined such that increases to transfer time may be obtained when transferring power by a static transfer switch between a first source and a second source by accepting a higher inrush current. The controller of the static transfer switch may obtain or otherwise receive, from a user, a specified allowed transfer time 402 and a specified allowed transfer inrush current 404. The flowchart 400 includes determining the phase difference between the preferred power source and the alternative power source represented as θ in FIG. 4 and described above with reference to FIG. 3 at 306. In embodiments, users may specify the specified allowed transfer time (transfer time) 402 and the specified allowed transfer inrush current (inrush current) 404 by interacting with an application in communication or otherwise associated with the controller of the static transfer switch or by interacting with a user interface of the static transfer switch. In some embodiments, the controller of the static transfer switch is configured to limit or enforce constraints on the transfer time and inrush current provided by users based on characteristics of the downstream transformer. For example, saturation characteristics of the transformer core (BH curve) determines the inrush current. In scenarios where different transformer with a different core material or different core dimensions are utilized or implemented, then the inrush current will vary based on the transformer used in the system. The controller of the static transfer switch may be configured to adjust or update the transfer time and inrush current provided by users based on the characteristics of the downstream transformer and/or based on an actual transfer time obtained when transferring power from the first power source to the second power source after successfully completing an initial transfer.

The flowchart 400 includes, at 408, determining by the controller of the STS the adaptive flux bands $\Delta\Phi 1$ and $\Delta\Phi 2$ using the specified allowed transfer time 402, the specified allowed transfer inrush current 404, and the phase difference between the preferred power source and the alternative power source represented as θ 406. The adaptive flux bands $\Delta\Phi 1$ and $\Delta\Phi 2$ determined by the controller are not fixed and instead are dynamically determined each time a transfer is required between power sources as the phase difference θ 406 changes based on the characteristics obtained by sensors of the STS at the time of turning off the preferred power source or alternative power source. The adaptive flux bands $\Delta\Phi 1$ and $\Delta\Phi 2$ represent a tolerance limit for use when comparing a flux mismatch between the transformer flux with an expected transformer flux from another power source (e.g., the first power source or the second power source). The adaptive flux bands $\Delta\Phi 1$ and $\Delta\Phi 2$ enable the controller of the STS to increase the tolerance limit to a level such that the resultant inrush current does not exceed the specified allowed transfer inrush current 404. This increased tolerance enables the STS to transfer between power sources at lower transfer times while taking the tradeoff of increased inrush current accepted by the electrical distribution system. Users can easily decide, or be provided the flexibility to decide, between choosing between the tradeoff of increased inrush current but increased transfer time between power sources. The adaptive flux bands $\Delta\Phi 1$ and $\Delta\Phi 2$ determined by the controller of the STS in accordance with the flowchart 400 may be used in the DIR algorithm of FIG. 3, except that the adaptive flux bands $\Delta\Phi 1$ and $\Delta\Phi 2$ of the present disclosure are not fixed values as are typically used in the DIR algorithm. Although FIGS. 3 and 4 may describe the transfer between the first power source (preferred power source) and second power source (alternative power source) the embodiments of the present disclosure also apply in the reverse scenario where the STS is transferring power from the second power source to the first power source or to another power source connected to the STS.

FIG. 5 depicts an example graph illustrating the increase in inrush current over time using a relaxed flux band in accordance with one or more examples of the present disclosure. The graph in FIG. 5 depicts the current for a three phase AC system in peak current per unit on the y-axis and time on the x-axis. The actual current depicted in FIG. 5 is a scaled version. The specified in-rush current and transfer time for the system that generated the output of FIG. 5 corresponds to a flux match band of 15% (e.g. a flux mismatch between the transformer flux with an expected transformer flux from another power source is allowed to be 15% different). As is illustrated in FIG. 5 by using a higher flux match band of 15% the transfer time is reduced but the inrush current exceeds 2 per unit, peak at certain times when transferring between the power sources. Depending on the characteristics of the transformer and/or the system of the user this may be an acceptable inrush current. The trade-off between transfer time and inrush current is made in the choice of the flux-band.

FIG. 6 depicts an example flowchart for adaptive flux band features in accordance with one or more examples of the present disclosure. FIG. 6 includes an exemplary process 600 which may be performed by an environment or architecture such as in FIGS. 2 and 7 for methods or features of FIGS. 3 and 4 by systems and components of FIGS. 2 and 7. However, it will be recognized that any of the following blocks may be performed in any suitable order and that the process 600 may be performed in any environment or architecture and by any suitable computing device and/or controller.

At step 602, the process 600 includes obtaining a transfer time for transferring the power from the first power source to the second power source. As described herein, the transfer time (e.g. specified allowed transfer time 402 of FIG. 4) may be user specified, limited by characteristics of a downstream transformer associated with or otherwise connected to the transfer switch system of the present disclosure, and/or adjusted based on the characteristics of the downstream transformer or based on an actual transfer time for transferring the power from the first power source to the second power source.

At step 604, the process 600 includes obtaining an inrush current not to be exceeded during transfer of the power from the first power source to the second power source. As described herein, the inrush current (e.g. specified allowed transfer inrush current 404 of FIG. 4), may be user specified, limited by characteristics of a downstream transformer associated with or otherwise connected to the transfer switch system of the present disclosure, and/or adjusted based on the characteristics of the downstream transfer or based on an actual transfer time for transferring the power from the first power source to the second power source.

At step 606, the process 600 includes determining a phase difference between the first power source and the second power source based on electrical measurements from the first power source and the second power source, obtained by one or more sensors. The one or more sensors may be integrated or otherwise in communication with the transfer switch system and configured to obtain or detect an electrical measurement associated with powering a load between the first power source, the second power source, and a downstream transformer. Additional details for determining the phase difference is provided above with reference to FIG. 3.

At step 608, the process 600 includes disconnect the first power source from the load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off. In embodiments, the semiconductor switch assembly includes at least one of silicon-controlled rectifiers (SCRs), insulate gate bipolar transistors (IGBTs), metal-oxide-semiconductors (MOSFETs), integrated gate-commutated thyristors (IGCTs), and gate turn-off thyristors (GTOs).

At step 610, the process 600 includes determining one or more flux bands based on the phase difference, the transfer time, and the inrush current. As described herein, the flux bands are adaptable thereby allowing a faster transfer time to switch between power sources by accepting a certain amount of inrush current whereas conventional systems use a fixed flux band when comparing flux bands during transfer by a transfer switch.

At step 612, the process 600 includes initiating a first connection between the second power source and the load by instructing each switch of a corresponding semiconductor switch assembly of the second power source to turn on at certain times based on flux matching using the determined one or more flux bands.

FIG. 7 is a block diagram of an exemplary system or device 700 within the environment 200 such as the controller 208. The system 700 includes a processor 704, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network. The system 700 may also include a bus 702 that connects the processor 704, ROM 706, RAM 708, storage 710, and/or the network interface 712. The components within the system 700 may use the bus 702 to communicate with each other. The components within the system 700 are merely exemplary and might not be inclusive of every component within the controller 704. Additionally, and/or alternatively, the system 700 may further include components that might not be included within every entity of environment 200. For instance, in some examples, the controller 704 might not include a network interface 712.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A transfer switch system for transferring power from a first power source to a second power source, the transfer switch system comprising:

one or more sensors configured to detect an electrical measurement associated with powering a load between the first power source, the second power source, and a downstream transformer;

one or more semiconductor switch assemblies, the first power source and the second power source associated with a different semiconductor switch assembly of the one or more semiconductor switch assemblies; and a controller configured to:

obtain a transfer time for transferring the power from the first power source to the second power source;

obtain an inrush current not to be exceeded during transfer of the power from the first power source to the second power source;

determine a phase difference between the first power source and the second power source based on electrical measurements from the first power source and the second power source, obtained by the one or more sensors;

disconnect the first power source from the load based on a detected disturbance with the first power source supplying the load, the detected disturbance determined based on the electrical measurements from the first power source obtained by the one or more sensors, the disconnect of the first power source executed by instructing, by the controller, the corresponding semiconductor switch assembly of the first power source to turn off;

determine one or more flux bands based on the phase difference, the transfer time, and the inrush current; and initiate a first connection between the second power source and the load by instructing each switch of the corresponding semiconductor switch assembly of the second power source to turn on at certain times based on flux matching using the determined one or more flux bands.

2. The transfer switch system according to claim 1, wherein the one or more semiconductor switch assemblies comprise at least one of silicon-controlled rectifiers (SCRs), insulate gate bipolar transistors (IGBTs), metal-oxide-semiconductors (MOSFETs), integrated gate-commutated thyristors (IGCTs), and gate turn-off thyristors (GTOs).

3. The transfer switch system according to claim 1, further comprising the downstream transformer, wherein the first power source and the second power source are configured to provide the power to the load via the downstream transformer.

4. The transfer switch system according to claim 1, wherein the transfer time and the inrush current are user specified.

5. The transfer switch system according to claim 1, wherein the controller is further configured to:

determine an updated phase difference between the first power source and the second power source based on the electrical measurements from the first power source, the second power source, and the downstream transformer obtained by the one or more sensors;

disconnect the second power source from the load based on an updated detected disturbance with the second power source providing the load, the updated detected disturbance based on the electrical measurements from the second power source obtained by the one or more sensors, the disconnect of the second power source executed by instructing, by the controller, the corresponding semiconductor switch assembly of the second power source to turn off;

determine updated one or more flux bands based on the updated phase difference, the transfer time, and the inrush current; and initiate a second connection between the first power source and the load by instructing each switch of the corresponding semiconductor switch assembly of the first power source to turn on at certain times based on the updated one or more flux bands.

6. The transfer switch system according to claim 1, wherein the one or more flux bands are updated as the first connection is initiated and as a first portion of switches of the corresponding semiconductor switch assembly of the second power source are turned on by adjusting the phase difference between the second power source and the downstream transformer based on updated electrical measurements from the second power source and the downstream transformer obtained by the one or more sensors.

7. The transfer switch system according to claim 1, wherein each switch or a set of switches of the semiconductor switch assemblies is associated with a different phase of an A/C voltage supplied to the load.

8. The transfer system according to claim 1, wherein the transfer time and the inrush current are limited by using characteristics of the downstream transformer.

9. The transfer system according to claim 1, wherein the controller is further configured to adjust the transfer time and the inrush current based on characteristics of the downstream transformer.

10. The transfer system according to claim 1, wherein the controller is further configured to:

obtain an actual transfer time for transferring the power from the first power source to the second power source derived from initiating a transfer; and adjust the one or more flux bands based on the actual transfer time.

11. A tangible, non-transitory computer-readable medium having instructions thereon which, upon being executed by one or more processors, provide for transferring power from a first power source to a second power source by execution of the following steps:

obtaining a transfer time for transferring the power from the first power source to the second power source;

obtaining an inrush current not to be exceeded during transfer of the power from the first power source to the second power source;

determining a phase difference between the first power source and the second power source based on electrical measurements from the first power source and the second power source, obtained by one or more sensors;

disconnecting the first power source from a load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off;

determining one or more flux bands based on the phase difference, the transfer time, and the inrush current; and initiating a first connection between the second power source and the load by instructing each switch of a corresponding semiconductor switch assembly of the second power source to turn on at certain times based on flux matching using the determined one or more flux bands.

12. The tangible, non-transitory computer-readable medium according to claim 11, wherein the transfer time and the inrush current are user specified.

13. The tangible, non-transitory computer-readable medium according to claim 11, wherein the instructions, upon being executed by the one or more processors, are further configured to execute the following steps:

determining an updated phase difference between the first power source and the second power source based on the electrical measurements from the first power source, the second power source, and an associated downstream transformer obtained by the one or more sensors;

disconnecting the second power source from the load based on an updated detected disturbance with the second power source providing the load, the updated detected disturbance based on the electrical measurements from the second power source obtained by the one or more sensors, the disconnect of the second power source executed by instructing the corresponding semiconductor switch assembly of the second power source to turn off;

determining updated one or more flux bands based on the updated phase difference, the transfer time, and the inrush current; and initiating a second connection between the first power source and the load by instructing each switch of the corresponding semiconductor switch assembly of the first power source to turn on at certain times based on the updated one or more flux bands.

14. The tangible, non-transitory computer-readable medium according to claim 11, wherein the one or more flux bands are updated as the first connection is initiated and as a first portion of switches of the corresponding semiconductor switch assembly of the second power source are turned on by adjusting the phase difference between the second power source and an associated downstream transformer based on updated electrical measurements from the second power source and the associated downstream transformer obtained by the one or more sensors.

15. The tangible, non-transitory computer-readable medium according to claim 11, wherein each switch or a set of switches of the corresponding semiconductor switch assemblies is associated with a different phase of an A/C voltage supplied to the load.

16. The tangible, non-transitory computer-readable medium according to claim 11, wherein the transfer time and the inrush current are limited by using characteristics of an associated downstream transformer.

17. The tangible, non-transitory computer-readable medium according to claim 11, wherein the instructions, upon being executed by the one or more processors, are further configured to execute the following steps: adjusting the transfer time and the inrush current based on characteristics of an associated downstream transformer.

18. The tangible, non-transitory computer-readable medium according to claim 11, wherein the instructions, upon being executed by the one or more processors, are further configured to execute the following steps:

obtaining an actual transfer time for transferring the power from the first power source to the second power source derived from initiating a transfer; and adjusting the one or more flux bands based on the actual transfer time.

19. A computer-implemented method for transferring power from a first power source to a second power source, comprising:

obtaining a transfer time for transferring the power from the first power source to the second power source;

obtaining an inrush current not to be exceeded during transfer of the power from the first power source to the second power source;

determining a phase difference between the first power source and the second power source based on electrical measurements from the first power source and the second power source, obtained by one or more sensors;

disconnecting the first power source from a load based on a detected disturbance with the first power source supplying the load, the detected disturbance determined based on the electrical measurements from the first power source obtained by the one or more sensors, the disconnect of the first power source executed by instructing a corresponding semiconductor switch assembly of the first power source to turn off;

determining one or more flux bands based on the phase difference, the transfer time, and the inrush current; and initiating a first connection between the second power source and the load by instructing each switch of a corresponding semiconductor switch assembly of the second power source to turn on at certain times based on flux matching using the determined one or more flux bands.

20. The computer-implemented method according to claim 19, wherein the one or more flux bands are updated as the first connection is initiated and as a first portion of switches of the corresponding semiconductor switch assembly of the second power source are turned on by adjusting the phase difference between the second power source and an associated downstream transformer based on updated electrical measurements from the second power source and the associated downstream transformer obtained by the one or more sensors.

\* \* \* \* \*